United States Patent
Tani

(10) Patent No.: US 9,352,796 B2
(45) Date of Patent: May 31, 2016

(54) FUEL SUPPLY PIPING ARRANGEMENT STRUCTURE FOR MOTORCYCLE

(71) Applicant: HONDA MOTOR CO., LTD., Tokyo (JP)

(72) Inventor: Yusaburo Tani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/629,761

(22) Filed: Feb. 24, 2015

(65) Prior Publication Data
US 2015/0246702 A1 Sep. 3, 2015

(30) Foreign Application Priority Data

Feb. 28, 2014 (JP) .................................. 2014-037933

(51) Int. Cl.
| | |
|---|---|
| *B62J 37/00* | (2006.01) |
| *F02M 35/16* | (2006.01) |
| *F02M 35/04* | (2006.01) |
| *F02M 35/10* | (2006.01) |
| *F02M 37/00* | (2006.01) |
| *F02M 69/46* | (2006.01) |

(52) U.S. Cl.
CPC .............. *B62J 37/00* (2013.01); *F02M 35/042* (2013.01); *F02M 35/048* (2013.01); *F02M 35/10177* (2013.01); *F02M 35/10216* (2013.01); *F02M 35/162* (2013.01); *F02M 37/007* (2013.01); *F02M 37/0017* (2013.01); *F02M 69/462* (2013.01)

(58) Field of Classification Search
CPC .. B62J 37/00; F02M 35/048; F02M 35/10216
USPC ....................................................... 180/219
See application file for complete search history.

(56) References Cited

U.S. PATENT DOCUMENTS

| | | | | |
|---|---|---|---|---|
| 5,927,254 | A * | 7/1999 | Ino ............................ | F01P 1/10 123/184.61 |
| 6,732,711 | B2 * | 5/2004 | Yanagii ................. | F02M 55/025 123/456 |
| 6,827,064 | B2 * | 12/2004 | Akagi ........................ | F02B 1/02 123/431 |
| 7,013,874 | B2 * | 3/2006 | Kurayoshi .............. | F02B 61/02 123/468 |
| 7,198,032 | B2 * | 4/2007 | Taguchi ................ | F02M 55/025 123/456 |

(Continued)

FOREIGN PATENT DOCUMENTS

JP 2011-137428 A 7/2011

*Primary Examiner* — Joseph Rocca
*Assistant Examiner* — Michael Stabley
(74) *Attorney, Agent, or Firm* — Westerman, Hattori, Daniels & Adrian, LLP

(57) ABSTRACT

A fuel supply piping arrangement structure includes an internal combustion engine, an air cleaner attached to a seat rail, an intake air passage connecting the internal combustion engine to the air cleaner, and a pair of fuel injection valves attached, on downstream upstream sides, respectively, to an intake system including the air cleaner and the intake air passage. Fuel supply piping having one end connected to a fuel tank, and another end side connected to each of the fuel injection valves. Joint portions connected to the fuel supply piping are oriented to one side in a vehicle width direction. Connector portions of the fuel supply piping connected to the joint portions are oriented to another side in the vehicle width direction toward the joint portions. The fuel supply piping disposed along the intake system and connected to the fuel injection valves from the one side in the vehicle width direction.

7 Claims, 10 Drawing Sheets

(56) References Cited

U.S. PATENT DOCUMENTS

| | | | | |
|---|---|---|---|---|
| 7,296,558 B2* | 11/2007 | Saeki | F02B 23/104 | 123/299 |
| 7,383,811 B2* | 6/2008 | Ueda | F02D 9/101 | 123/299 |
| 7,571,714 B2* | 8/2009 | Miyashiro | F01N 13/20 | 123/470 |
| 7,647,917 B2* | 1/2010 | Matsuda | F02M 69/465 | 123/447 |
| 8,439,015 B2* | 5/2013 | Kimura | F02M 35/10216 | 123/299 |
| 8,534,406 B2* | 9/2013 | Nakajin | B62J 37/00 | 180/219 |
| 8,813,724 B2* | 8/2014 | Kondo | B62J 35/00 | 123/468 |
| 8,875,684 B2* | 11/2014 | Kondo | B62J 35/00 | 123/518 |
| 2011/0174273 A1 | 7/2011 | Otsuka et al. | | |
| 2013/0125863 A1* | 5/2013 | Suzuki | F02M 61/14 | 123/468 |
| 2013/0186370 A1* | 7/2013 | Uchiyama | F02M 63/0275 | 123/445 |
| 2014/0318499 A1* | 10/2014 | Tanaka | F02D 41/30 | 123/478 |

* cited by examiner

FUEL SUPPLY PIPING ARRANGEMENT STRUCTURE FOR MOTORCYCLE

FIELD OF THE INVENTION

The present invention relates to a fuel supply piping arrangement structure for a motorcycle which structure includes fuel supply piping for supplying a fuel from a fuel tank to a pair of fuel injection valves provided to an intake air passage.

BACKGROUND OF THE INVENTION

A conventional motorcycle is known which has a pair of fuel injection valves disposed in an intake air passage (see for example Japanese Patent Laid Open No. 2011 137428, hereinafter "JP '428"). Fuel supply piping extending from a fuel tank is connected to each of the fuel injection valves.

SUMMARY OF THE INVENTION

In JP '428, when the plurality of fuel injection valves are disposed in the intake air passage, the arrangement of the fuel supply piping extending from the fuel tank to each of the fuel injection valves may become complex, and it may be difficult to attach or detach the fuel supply piping at a time of assembly or at a time of maintenance.

One object of the present invention to provide a fuel supply piping arrangement structure for a motorcycle which structure can improve the assemblability and maintainability of fuel supply piping.

In order to solve the above problems, according to the present invention, there is provided a fuel supply piping arrangement structure for a motorcycle, the fuel supply piping arrangement structure including: an internal combustion engine (14) attached to a main frame (22); an air cleaner (113) attached to a seat rail (27); an intake air passage (166) connecting the internal combustion engine (14) and the air cleaner (113) to each other; a pair of fuel injection valves (115, 124) attached, on a downstream side and an upstream side, respectively, to an intake system (47) including the air cleaner (113) and the intake air passage (166); and fuel supply piping (131) having one end connected to a fuel tank (127) disposed on the main frame (22), and having another end side connected to each of the fuel injection valves (115, 124), wherein respective joint portions (115a, 124a) of the pair of fuel injection valves (115, 124), the joint portions (115a, 124a) being connected to the fuel supply piping (131), are oriented to one side in a vehicle width direction, connector portions (186, 187) of the fuel supply piping (131), the connector portions (186, 187) being connected to the joint portions (115a, 124a), are oriented to another side in the vehicle width direction toward the joint portions (115a, 124a), and the fuel supply piping (131) is disposed along the intake system (47) and connected to the pair of fuel injection valves (115, 124) from the one side in the vehicle width direction.

The connector portions may be formed by a T-shaped joint (186) connected to the fuel injection valve (115) on the downstream side and an L-shaped joint (187) connected to the fuel injection valve (124) on the upstream side, and respective connection portions (186b, 187b) from the T-shaped joint (186) and the L-shaped joint (187) may be oriented toward the joint portions (115a, 124a).

In addition, the fuel supply piping (131) may be disposed on an opposite side of the intake system (47) in the vehicle width direction from a throttle pulley (163) opening and closing a throttle valve (176) provided in the intake air passage (166).

In addition, the fuel supply piping arrangement structure may further include a cross member (92) that couples a left frame and a right frame (23) to each other and to which one end of a rear cushion unit (91) is attached, wherein the intake system (47) may be disposed so as to pass, in a forward-rearward direction, a central portion in the vehicle width direction above the cross member (92), the fuel injection valves (115, 124) may be attached on a center line of the intake system (47), the center line of the intake system (47) extending longitudinally, and the fuel supply piping (131) may be attached so as to be offset to one side in the vehicle width direction with respect to the intake air passage (166), and may be disposed between the left and right frames (23).

In addition, the one end of the fuel supply piping (131) may be connected to a fuel pump (128) attached to a lower portion within the fuel tank (127), and a position of the fuel supply piping (131) may be regulated by a part of the fuel tank (127) via an elastic member (167).

In addition, the fuel injection valve (124) on the upstream side may be attached to an air cleaner case (118) forming the air cleaner (113), and a positioning portion (116b) positioning the fuel supply piping (131) may be formed in the air cleaner case (118).

In addition, a protective cover (125) may cover the fuel injection valve (124) on the upstream side from above, and the fuel supply piping (131) may be held between the protective cover (125) and the positioning portion (116b) of the air cleaner case (118).

According to the present invention, the respective joint portions of the pair of fuel injection valves, the joint portions being connected to the fuel supply piping, are oriented to one side in the vehicle width direction, the connector portions of the fuel supply piping, the connector portions being connected to the joint portions, are oriented to another side in the vehicle width direction toward the joint portions, and the fuel supply piping is disposed along the intake system and connected to the pair of fuel injection valves from the one side in the vehicle width direction. Therefore, the fuel supply piping can be shortened, and the fuel supply piping connected to the two fuel injection valves can be detached and attached from and to the one side of the vehicle body. Thus, assemblability and maintainability can be improved.

In addition, the connector portions are formed by the T-shaped joint connected to the fuel injection valve on the downstream side and the L-shaped joint connected to the fuel injection valve on the upstream side, and the respective connection portions from the T-shaped joint and the L-shaped joint are oriented toward the joint portions. Thus, the connector portions of the fuel supply piping can be oriented to the joint portions easily with a simple constitution.

In addition, the fuel supply piping is disposed on the opposite side of the intake system in the vehicle width direction from the throttle pulley that opens and closes the throttle valve provided in the intake air passage. Therefore, the fuel supply piping can be detached and attached without interfering with the throttle pulley and throttle cables connected to the throttle pulley.

In addition, the fuel supply piping arrangement structure further includes the cross member that couples the left and right frames to each other and to which one end of the rear cushion unit is attached, the intake system is disposed so as to pass, in the forward-rearward direction, the central portion in the vehicle width direction above the cross member, the fuel injection valves are attached on the center line of the intake system, the center line of the intake system extending longitudinally, and the fuel supply piping is attached so as to be offset to the one side in the vehicle width direction with respect to the intake air passage, and is disposed between the left and right frames. Therefore, while the fuel supply piping is disposed on the central side of the vehicle body, the fuel supply piping can be easily detached and attached from and to the fuel injection valves without interfering with the intake system. Furthermore, the fuel supply piping can be protected by the left and right frames.

In addition, the one end of the fuel supply piping is connected to the fuel pump attached to the lower portion within the fuel tank, and the position of the fuel supply piping is regulated by a part of the fuel tank via the elastic member. The elastic member can therefore suppress the vibration of the fuel supply piping.

In addition, the fuel injection valve on the upstream side is attached to the air cleaner case forming the air cleaner, and the positioning portion positioning the fuel supply piping is formed in the air cleaner case. The positioning portion can therefore further suppress the vibration of the fuel supply piping.

In addition, the protective cover covers the fuel injection valve on the upstream side from above, and the fuel supply piping is held between the protective cover and the positioning portion of the air cleaner case. The positioning portion and the protective cover can therefore still further suppress the vibration of the fuel supply piping.

BRIEF DESCRIPTION OF THE DRAWINGS

The present invention will be described with reference to the accompanying drawings, wherein.

DETAILED DESCRIPTION OF THE INVENTION

Figure 1:
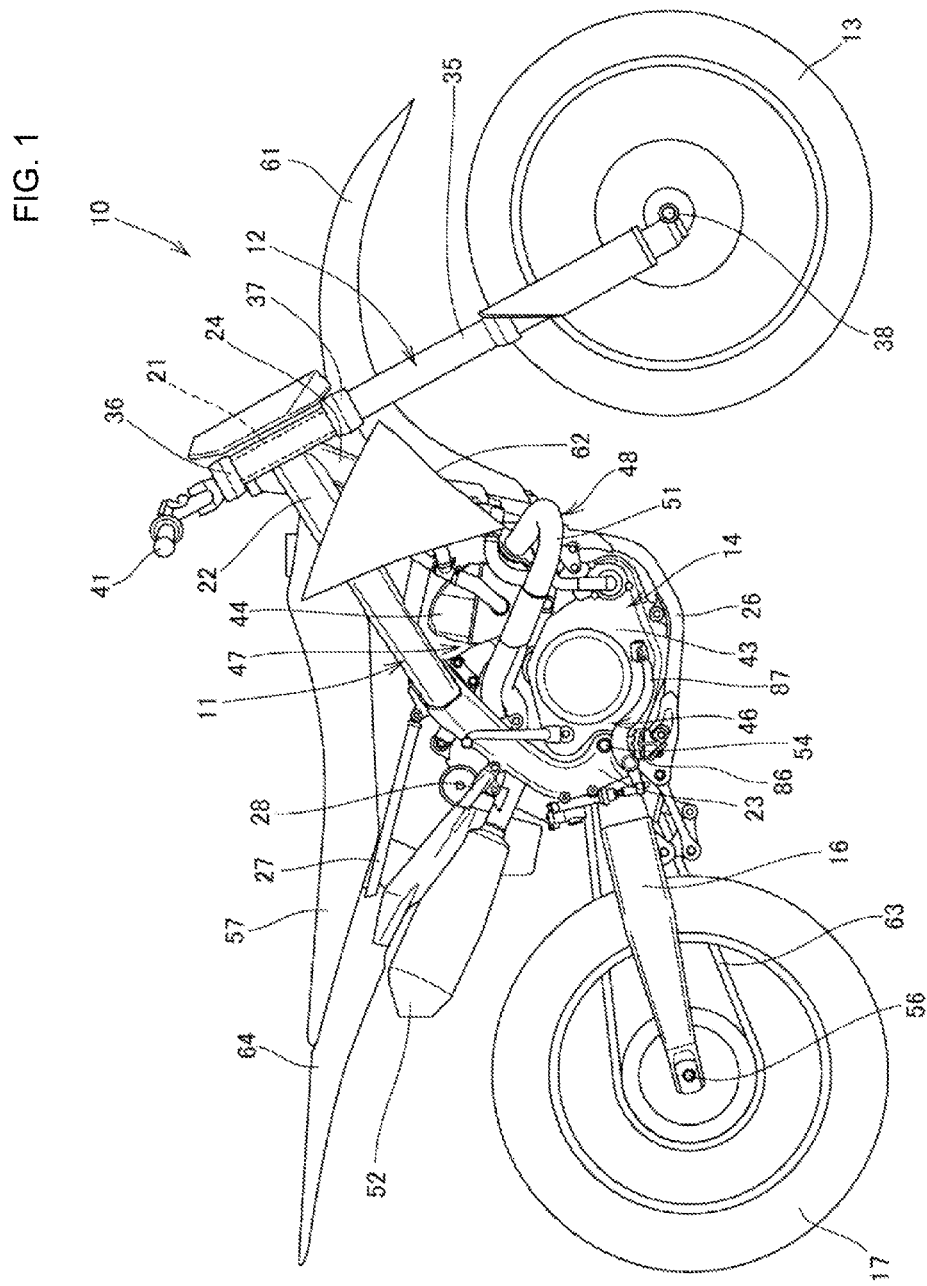
FIG. 1 is a right side view of a motorcycle having a fuel supply piping arrangement structure according to one embodiment of the present invention.

An embodiment of the present invention will hereinafter be described with reference to the aforementioned drawings. It is to be noted that directions such as a forward direction, a rearward direction, a left direction, a right direction, an upward direction, a downward direction, and the like in the description are identical with directions with respect to a vehicle body unless otherwise specified. In addition, a reference character FR shown in figures indicates the forward direction of the vehicle body, a reference character UP indicates the upward direction of the vehicle body, and a reference character LE indicates the left direction of the vehicle body.

FIG. 1 is a right side view of a motorcycle 10 having a fuel supply piping arrangement structure according to one embodiment of the present invention.

The motorcycle 10 is a saddle riding type vehicle in which a front wheel 13 is steerably supported by the front end portion of a vehicle body frame 11 via a front fork 12, an engine 14 is supported by the lower portion of the vehicle body frame 11, and a rear wheel 17 is supported by the rear lower portion of the vehicle body frame 11 via a swing arm 16.

The vehicle body frame 11 includes a head pipe 21, a pair of left and right main frames 22, a pair of left and right pivot plates 23, a down frame 24, a pair of left and right under frames 26, a pair of left and right seat rails 27, and a pair of left and right sub-frames 28.

The head pipe 21 forms the front end portion of the vehicle body frame 11. The main frames 22 extend from the head pipe 21 rearward and obliquely downward on the left and the right. The pivot plates 23 extend from the rear end portions of the left and right main frames 22 downward and obliquely rearward and then downward and obliquely frontward. The down frame 24 extends downward and obliquely rearward from portions where the left and right main frames 22 are attached to the head pipe 21. The under frames 26 extend from the lower end portion of the down frame 24 downward on the left and the right, extend rearward below the engine 14, and are coupled to the pivot plates 23. The rear end portions of the seat rails 27 extend from the lower end portions of the main frames 22 rearward and obliquely upward, and are coupled to the rear end portions of the sub-frames 28 that extend from the pivot plates 23 rearward and obliquely upward.

The front fork 12 is formed by a pair of left and right fork pipes 35, a top bridge 36, a bottom bridge 37, and a steering stem (not shown). The fork pipes 35 are formed by a shock absorber. The front wheel 13 is supported by the lower end portions of the left and right fork pipes 35 via an axle 38. The top bridge 36 and the bottom bridge 37 are stretched over the left and right fork pipes 35. Handlebars 41 are attached to the top bridge 36. The steering stem is rotatably supported by the head pipe 21, and is vertically attached to the respective centers of the top bridge 36 and the bottom bridge 37.

The engine 14 is supported by the pivot plates 23, the down frame 24, and the under frames 26. The engine 14 includes a crankcase 43 and a cylinder portion 44 extending upward from the front upper portion of the crankcase 43. Incidentally, a reference numeral 45 denotes an engine hanger attached to the upper end portions of the pivot plates 23 to support the engine 14.

A transmission 46 is integrally attached to the rear portion of the crankcase 43. The cylinder portion 44 includes a rear portion connected with an intake device 47 and a front portion connected with an exhaust device 48. The exhaust device 48 includes: an exhaust pipe 51 projecting from the cylinder portion 44 to the right side of the vehicle body, extending rearward while bending, and further branching and extending rearward to the left and to the right; and a pair of left and right mufflers 52 connected to the rear end portions of the exhaust pipe 51.

The swing arm 16 is vertically swingably supported by a pivot shaft 54 provided to the lower portions of the pivot plates 23. The rear end portion of the swing arm 16 supports the rear wheel 17 via an axle 56. A seat 57 is supported by the upper portions of the main frames 22 and the seat rails 27. Incidentally, a reference numeral 61 denotes a front fender covering the front wheel 13 from above. A reference numeral 62 denotes a pair of left and right shrouds covering the left and right sides of the front portion of the vehicle body frame 11. A reference numeral 63 denotes a chain that transmits power from the transmission 46 to the rear wheel 17. A reference numeral 64 denotes a rear fender covering the rear wheel 17 from above.

Figure 2:
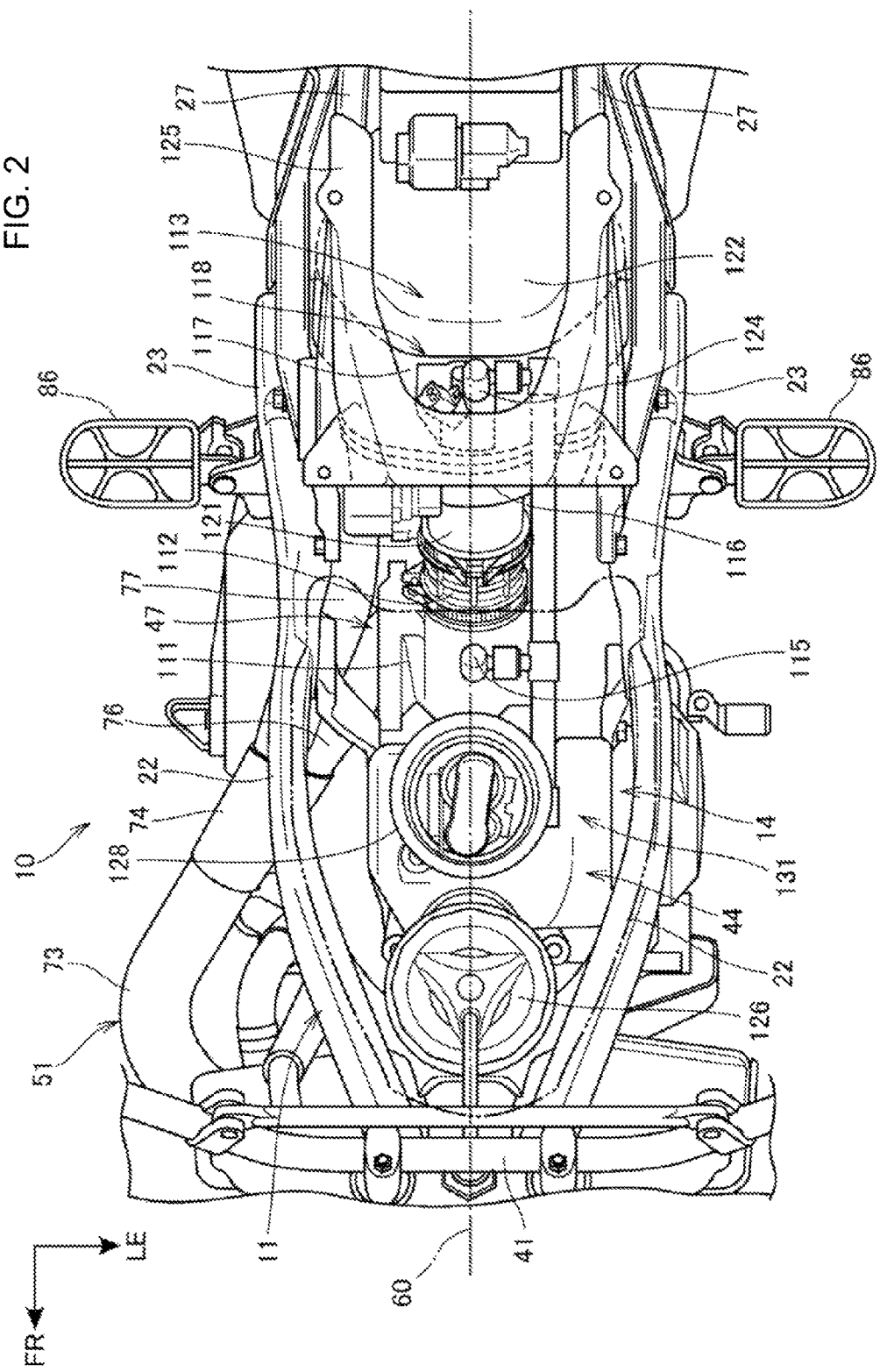
FIG. 2 is a plan view of a central portion in a forward-rearward direction of the motorcycle.

FIG. 2 is a plan view of a central portion in a forward-rearward direction of the motorcycle 10.

The intake device 47 extends from the rear portion of the cylinder portion 44 (specifically a cylinder head (not shown)) of the engine 14 to the rear of the vehicle body. The intake device 47 is disposed on a vehicle body center line 60 extending longitudinally in a center in a vehicle width direction. The intake device 47 includes a throttle body 111 provided with a throttle valve (not shown) and an air cleaner 113 connected to the rear end of the throttle body 111 via a connecting tube 112.

A first fuel injection valve 115 that injects a fuel into an intake air passage within the throttle body 111 is attached to a center in the vehicle width direction of the throttle body 111.

The air cleaner 113 includes an air cleaner case 118, a case intake pipe portion 121, and an air cleaner element 122. The air cleaner 113 is attached to the left and right seat rails 27. The air cleaner case 118 includes a front case 116 and a rear case 117 of a structure divided into the two front and rear parts. The case intake pipe portion 121 is provided to the front case 116 so as to project frontward and obliquely downward. The air cleaner element 122 is provided to the rear portion of the rear case 117.

A second fuel injection valve 124 that injects the fuel into the intake air passage within the air cleaner case 118 is attached to the upper portion of the rear case 117. The front end portion of the case intake pipe portion 121 is connected to the connecting tube 112. Incidentally, a reference numeral 125 denotes an intake side cover that covers the periphery of the air cleaner 113 and the second fuel injection valve 124. The intake side cover is attached to the upper portions of the seat rails 27.

Fuel supply piping 131 that extends from a fuel pump 128 provided in the lower portion of a fuel tank 127 is connected to the first fuel injection valve 115 and the second fuel injection valve 124. The fuel supply piping 131 extends substantially linearly in the forward-rearward direction. Incidentally, a reference numeral 126 denotes a tank cap that covers the fuel filler of the fuel tank 127.

The exhaust pipe 51 connected to the front portion of the cylinder portion 44 of the engine 14 includes a front exhaust pipe 73 bending rearward, a branch pipe 74 connected to the rear end of the front exhaust pipe 73, and a left rear exhaust pipe 76 and a right rear exhaust pipe 77 connected to the rear end of the branch pipe 74. The left rear exhaust pipe 76 and the right rear exhaust pipe 77 are connected to the left and right mufflers 52 (see FIG. 1).

The left rear exhaust pipe 76 passes below the intake device 47, and extends to the inside in the vehicle width direction of the left pivot plate 23.

Figure 3:
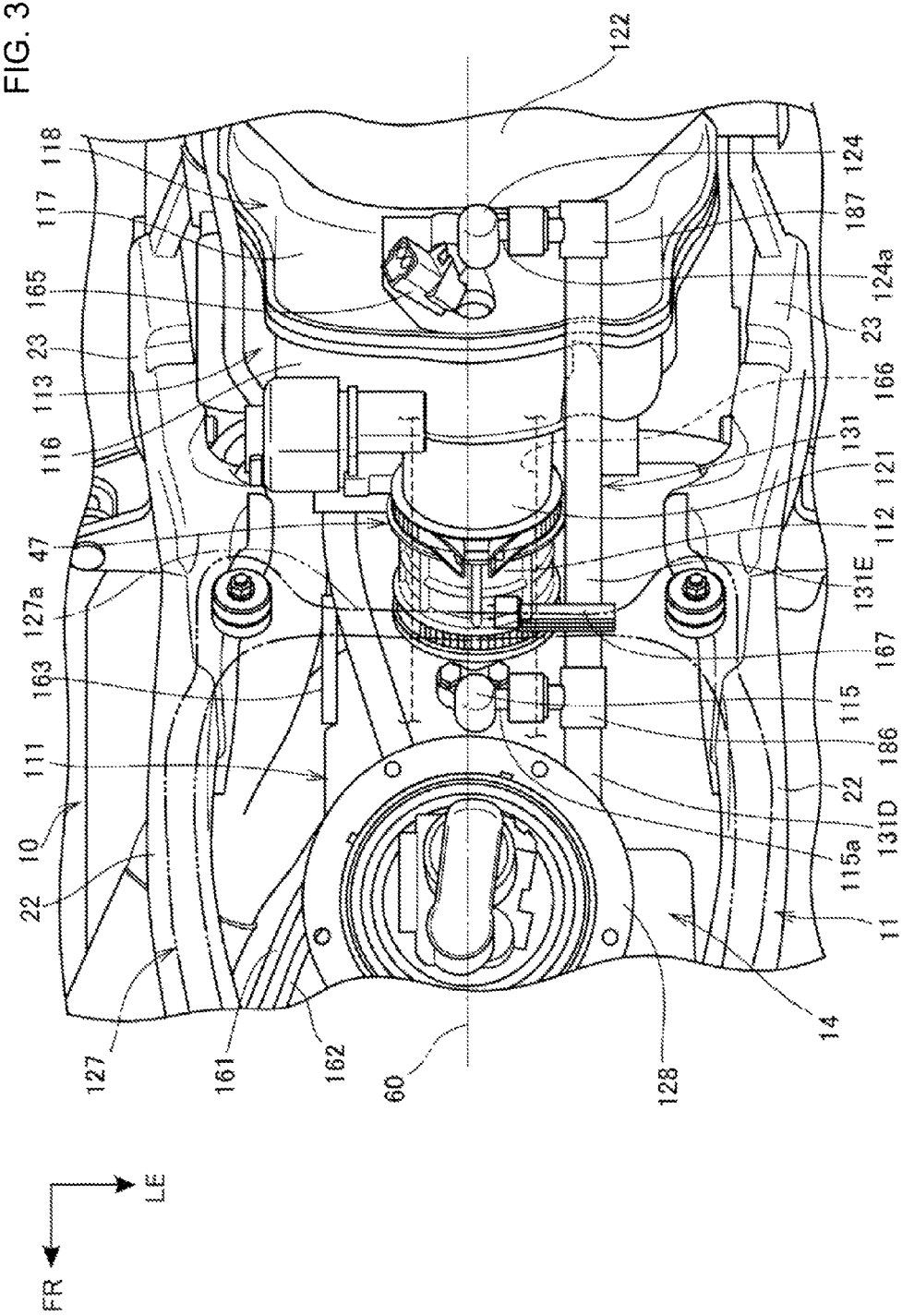
FIG. 3 is a fragmentary plan view of an intake device of the motorcycle and the periphery thereof.

FIG. 3 is a fragmentary plan view of the intake device 47 of the motorcycle 10 and the periphery thereof.

The upper left portions of the first fuel injection valve 115 and the second fuel injection valve 124 are provided with fuel suction ports 115a and 124a, respectively, for sucking in the fuel. The fuel suction ports 115a and 124a are oriented to the left in the vehicle width direction. These fuel suction ports 115a and 124a are connected with a T-shaped joint 186 and a second L-shaped joint 187, respectively, provided to the fuel supply piping 131, via a hose made of rubber.

The fuel supply piping 131 is disposed along the vehicle body center line 60 on the left side of the vehicle body center line 60, and is held down from above at a position in the rear of the T-shaped joint 186 via a rubber piece 167 provided on the rear of a flange portion 127a of the fuel tank 127. Hence, the fuel supply piping 131 is positioned in an upward direction, so that the vibration of the fuel supply piping 131 can be suppressed.

A throttle pulley 163 to which two throttle cables 161 and 162 are coupled is disposed on the right side portion of the throttle body 111. The throttle pulley 163 is attached, together with a throttle valve, to a throttle shaft rotatably supported by the main body of the throttle body 111. Incidentally, a reference numeral 165 denotes a connector provided to the second fuel injection valve 124 to connect a harness that supplies power for actuating the second fuel injection valve 124.

An intake air passage 166 that communicates through the constituent parts of the intake device 47 and which is connected to the intake port of the engine 14 is formed in the intake device 47.

Figure 4:
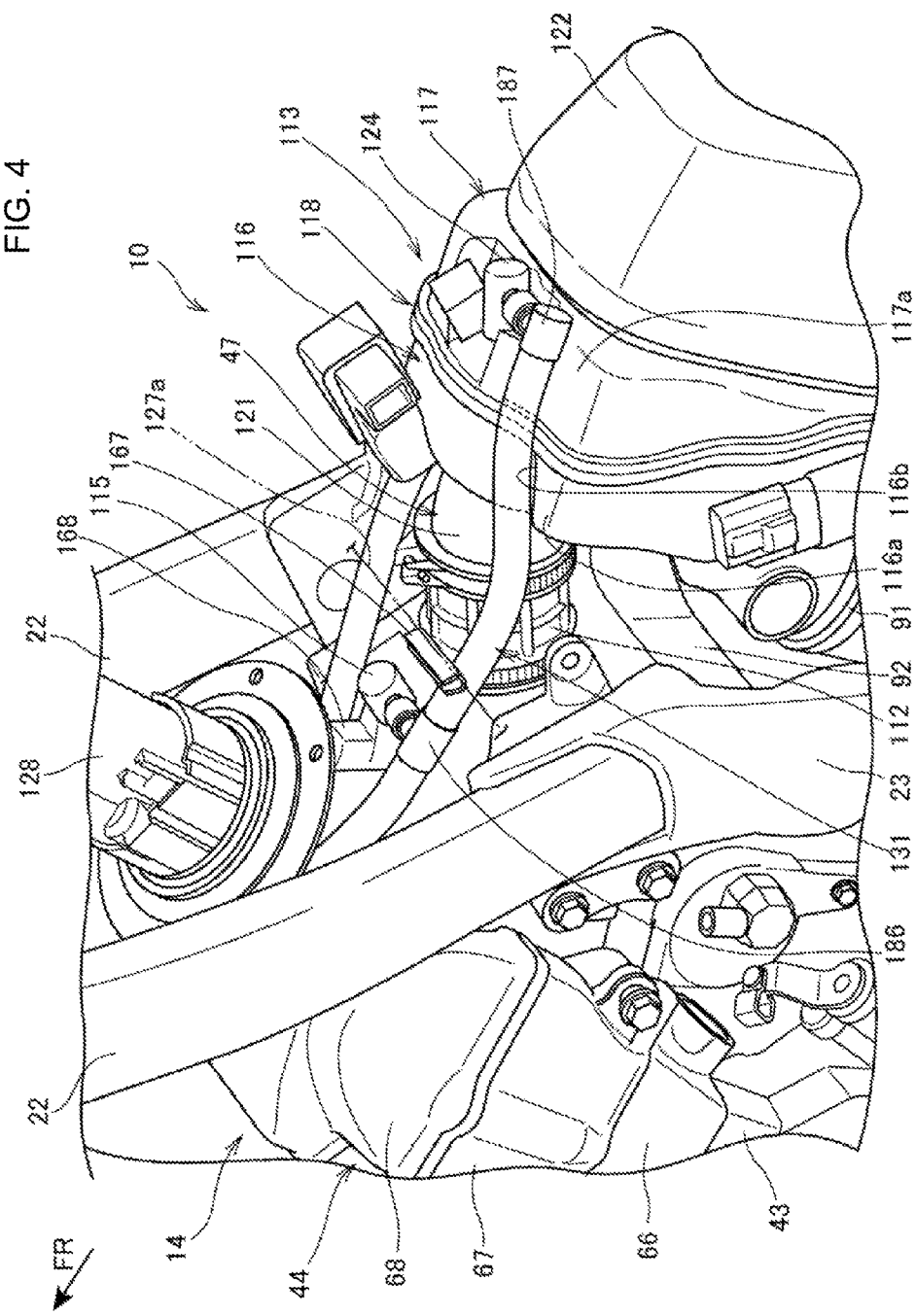
FIG. 4 is a fragmentary perspective view of the intake device of the motorcycle and the periphery thereof.

FIG. 4 is a fragmentary perspective view of the intake device 47 of the motorcycle 10 and the periphery thereof.

The cylinder portion 44 of the engine 14 includes: a cylinder block 66 attached to the front upper portion of the crankcase 43; a cylinder head 67 attached to the upper portion of the cylinder block 66; and a head cover 68 that covers the upper portion of the cylinder head 67.

A pipe-shaped cross member 92 is stretched and attached between the left and right pivot plates 23. The intake device 47 is disposed above the cross member 92. The fuel supply piping 131 is disposed above the left side of the intake device 47.

The fuel supply piping 131 greatly bends so as to be projected downward from the side of the fuel pump 128, bends upward in the rear of the part held down by the rubber piece 167, bends downward in the vicinity of the second L-shaped joint 187, and extends along a top surface 117a of the rear case 117 of the air cleaner case 118.

In addition, the fuel supply piping 131 between the T-shaped joint 186 and the second L-shaped joint 187 is disposed within a recessed portion 116b formed in a top surface 116a of the front case 116 of the air cleaner case 118, and is held down by the intake side cover 125 (see FIG. 2) that covers the left and right of the air cleaner 113 from above. That is, the fuel supply piping 131 is held between the front case 116 and the intake side cover 125. Hence, vertical vibration of the fuel supply piping 131, which is also held down from above by the rubber piece 167, can be suppressed, and further displacement and vibration in the vehicle width direction of the fuel supply piping 131 can be suppressed because the fuel supply piping 131 is disposed within the recessed portion 116b of the front case 116.

Here, a reference numeral 168 denotes a connector provided to the first fuel injection valve 115 to connect a harness that supplies power for actuating the first fuel injection valve 115.

Figure 5:
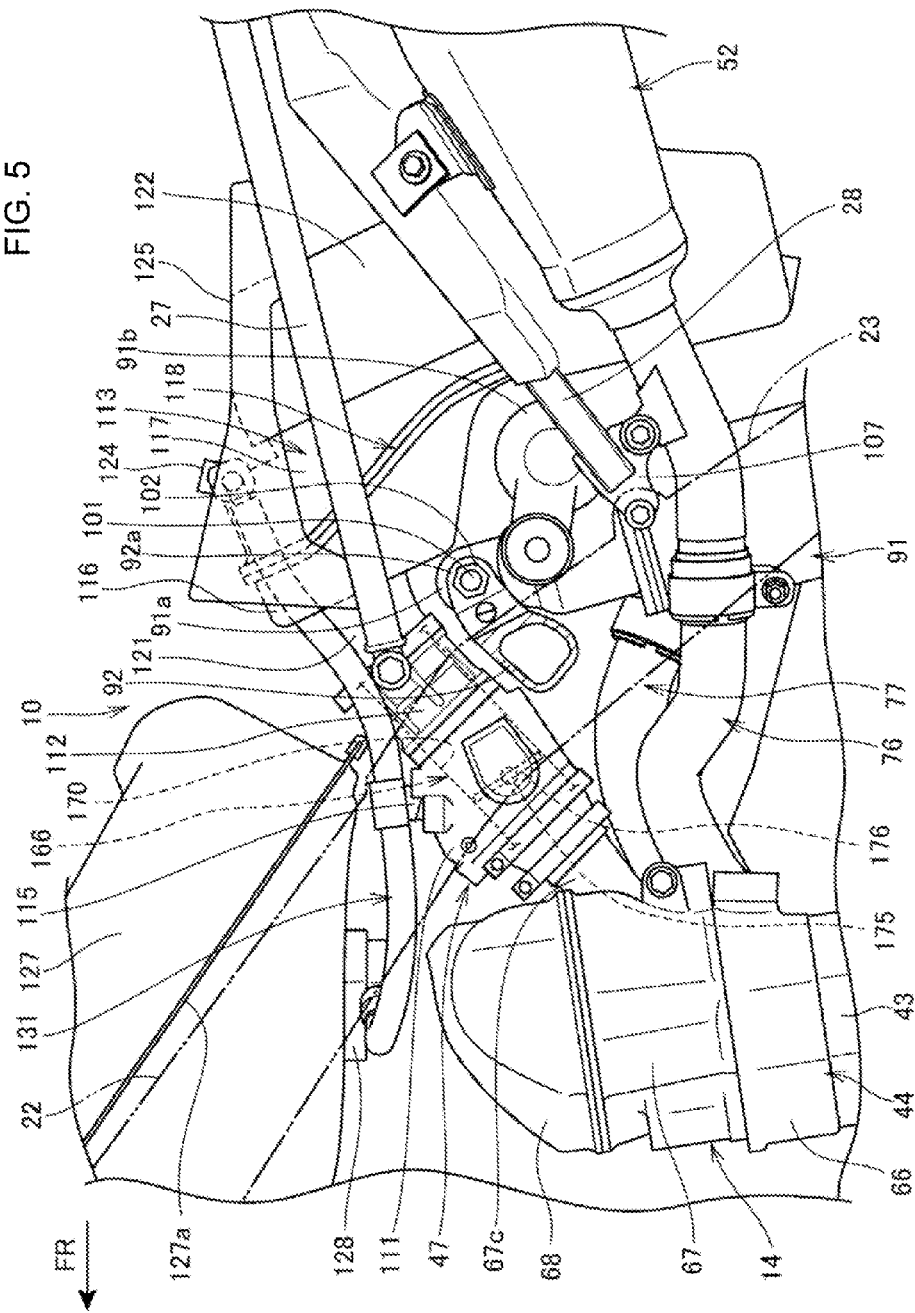
FIG. 5 is a fragmentary left side view of the intake device of the motorcycle and the periphery thereof.

FIG. 5 is a fragmentary left side view of the intake device 47 of the motorcycle 10 and the periphery thereof, with the main frames 22 and the pivot plates 23 omitted.

The left rear exhaust pipe 76 passes below the intake device 47, and extends to the left in the vehicle width direction of a rear cushion unit 91.

An upper end portion 91a of the rear cushion unit 91 is attached, by a bolt 101 and a nut 102, to an upper cushion supporting portion 92a that projects rearward and obliquely upward from a central portion in the vehicle width direction of the cross member 92 stretched between the left and right pivot plates 23. The rear cushion unit 91 extends in substantially the upward-downward direction. An oil reservoir tank 91b is provided integrally with the upper rear portion of the rear cushion unit 91 to store a part of oil circulating to and from the inside of the rear cushion unit 91.

The intake device 47 extends rearward and obliquely upward from an intake pipe 67c provided integrally with the rear portion of the cylinder head 67. A main air passage 170 forming a part of the intake air passage 166 is formed in the throttle body 111. A throttle shaft 175 is rotatably supported by the throttle body 111 so as to cross the main air passage 170 in the vehicle width direction. A throttle valve 176 that opens and closes the main air passage 170 is attached to the throttle shaft 175.

The intake device 47 is disposed above the left rear exhaust pipe 76, the rear cushion unit 91, and the cross member 92. The front side of the intake device 47, that is, the throttle body 111 and the connecting tube 112 are disposed below the fuel tank 127.

Because the oil reservoir tank 91b projects from the upper rear portion of the rear cushion unit 91, a lower front surface 116c of the front case 116 of the air cleaner case 118 is recessed to avoid interfering with the oil reservoir tank 91b.

The upper front end portion of the intake side cover 125 is located at a higher position than the second fuel injection valve 124. Thus, the intake side cover 125 can protect the second fuel injection valve 124 even when the seat 57 (see FIG. 1) disposed over the intake side cover 125 and in the rear of the fuel tank 127 is bent downward due to the riding of an occupant.

The fuel supply piping 131 includes a first L-shaped joint 185, a front side hose 131D, the T-shaped joint 186, a rear side hose 131E, and the second L-shaped joint 187 in this order from the front.

The first L-shaped joint 185 is connected to the fuel pump 128. The T-shaped joint 186 is connected to the first fuel injection valve 151. The second L-shaped joint 187 is connected to the second fuel injection valve 124.

The rear side hose 131E is longer than the front side hose 131D. The rear side hose 131E is disposed so as to overlap the connecting tube 112, the case intake pipe portion 121, and the air cleaner case 118 as viewed from the side. Hence, an amount of upward projection of the rear side hose 131E from the intake device 47 can be reduced, and thus the rear side hose 131E can be protected from interfering objects from above.

Figure 6:
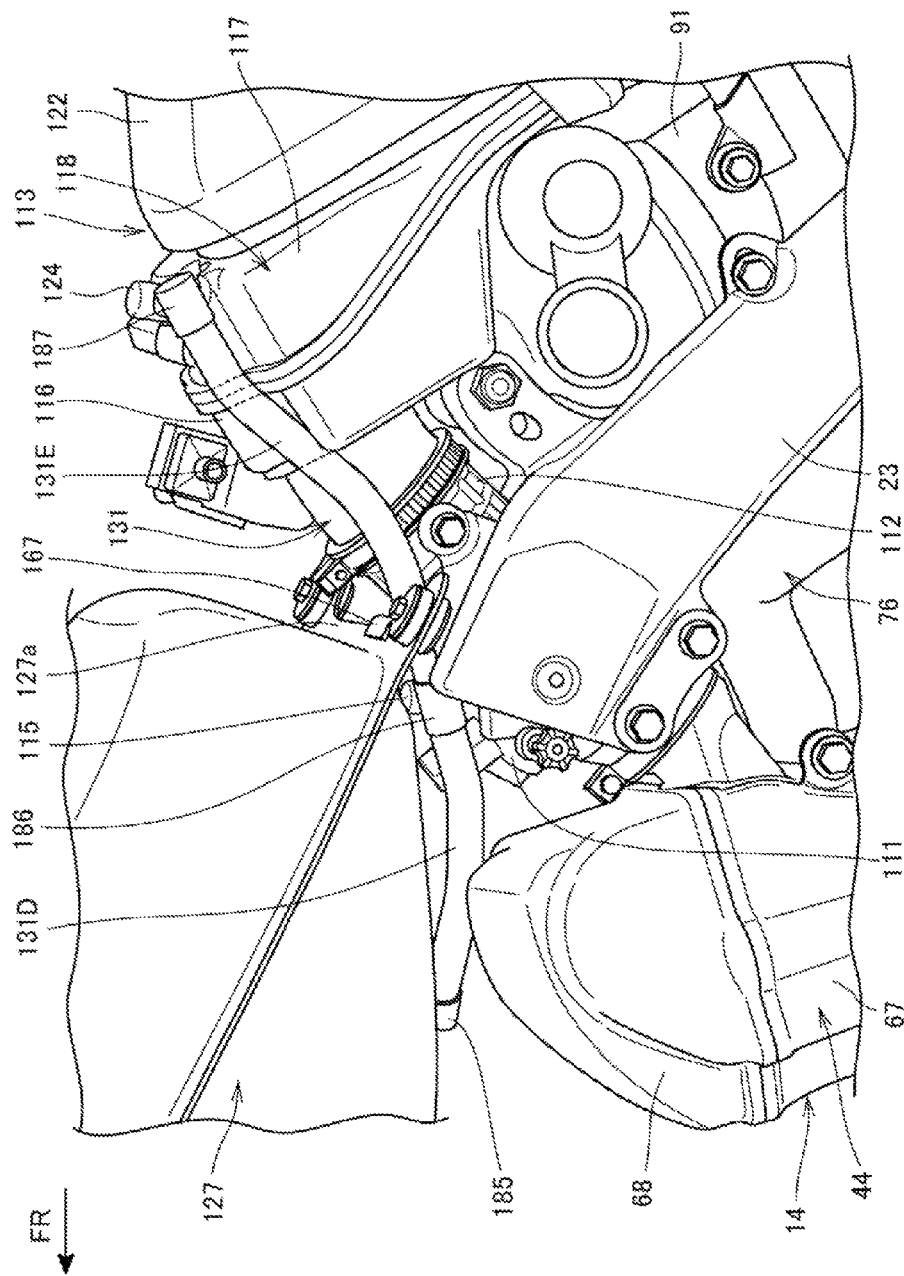
FIG. 6 is a fragmentary perspective view of the arrangement of fuel supply piping.

FIG. 6 is a fragmentary perspective view of the arrangement of the fuel supply piping 131.

The front side hose 131D made of rubber has a front end thereof connected to the first L-shaped joint 185, and has a rear end thereof connected to the T-shaped joint 186. The rear side hose 131E made of rubber has a front end thereof connected to the T-shaped joint 186, and has a rear end thereof connected to the second L-shaped joint 187.

Because the rubber piece 167 holding down the rear side hose 131E from above is attached to the flange portion 127a of the fuel tank 127, no special member for supporting the rubber piece 167 is necessary, so that the number of parts is not increased. Thus, a cost reduction can be achieved.

The fuel supply piping 131 passes through narrow spaces in the vehicle body, for example, between the head cover 68 and the fuel tank 127, between the left pivot plate 23 and the first fuel injection valve 115, and between the throttle body 111 and the connecting tube 112 and the fuel tank 127. Therefore, an arrangement structure to be described in the following is adopted so as not to make difficult assembly at a time of manufacture or detachment and attachment at a time of maintenance.

Figure 7:
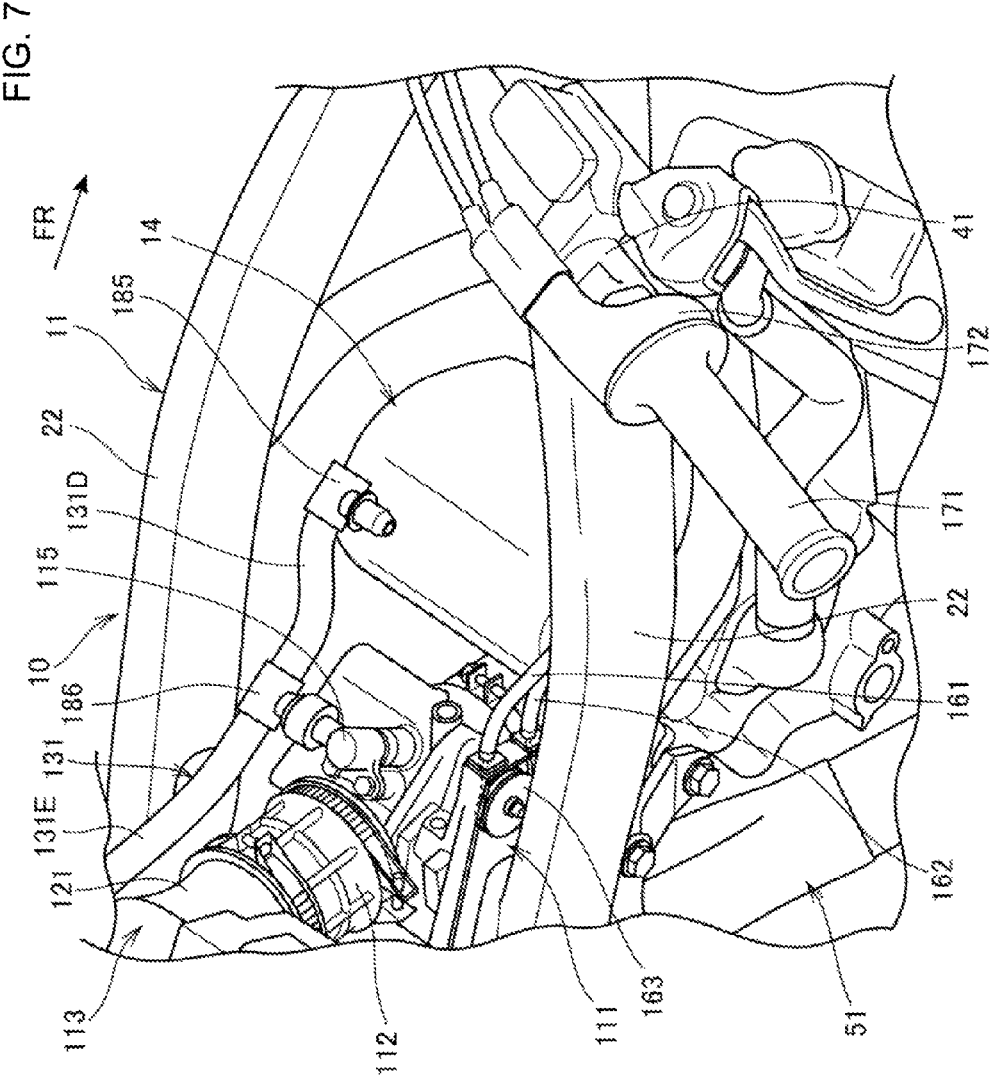
FIG. 7 is a fragmentary perspective view of portions from the front of the vehicle body of the motorcycle to the center of the vehicle body.

FIG. 7 is a fragmentary perspective view of portions from the front of the vehicle body of the motorcycle 10 to the center of the vehicle body.

The throttle pulley 163 attached to the throttle shaft is disposed on the right side portion of the throttle body 111.

The two throttle cables 161 and 162 are connected to the throttle pulley 163. The throttle cables 161 and 162 extend from the inside of a throttle housing 172 adjacent to a throttle grip 171 provided at the right end of the handlebars 41 along the front fork 12 (see FIG. 1) and the vehicle body frame 11, and reach the throttle pulley 163.

A disk-shaped rotary portion formed integrally with the throttle grip 171 is provided within the throttle housing 172. One end portion of each of respective inner wires forming the throttle cables 161 and 162 is coupled to the outer periphery of the rotary portion. Another end portion of each of the respective inner wires of the throttle cables 161 and 162 is also coupled to the outer periphery of the throttle pulley 163. Therefore, when the throttle grip 171 is rotated, the throttle pulley 163 is rotated via the throttle cables 161 and 162 to open and close the throttle valve via the throttle shaft.

In the present embodiment, the fuel supply piping 131 is disposed on the side of the left side portion which is opposite in the vehicle width direction from the throttle pulley 163 of the throttle body 111. Hence, the throttle pulley 163 and the throttle cables 161 and 162 do not become obstacles when the fuel supply piping 131 is detached or attached at a time of assembly and at a time of maintenance.

Figure 8:
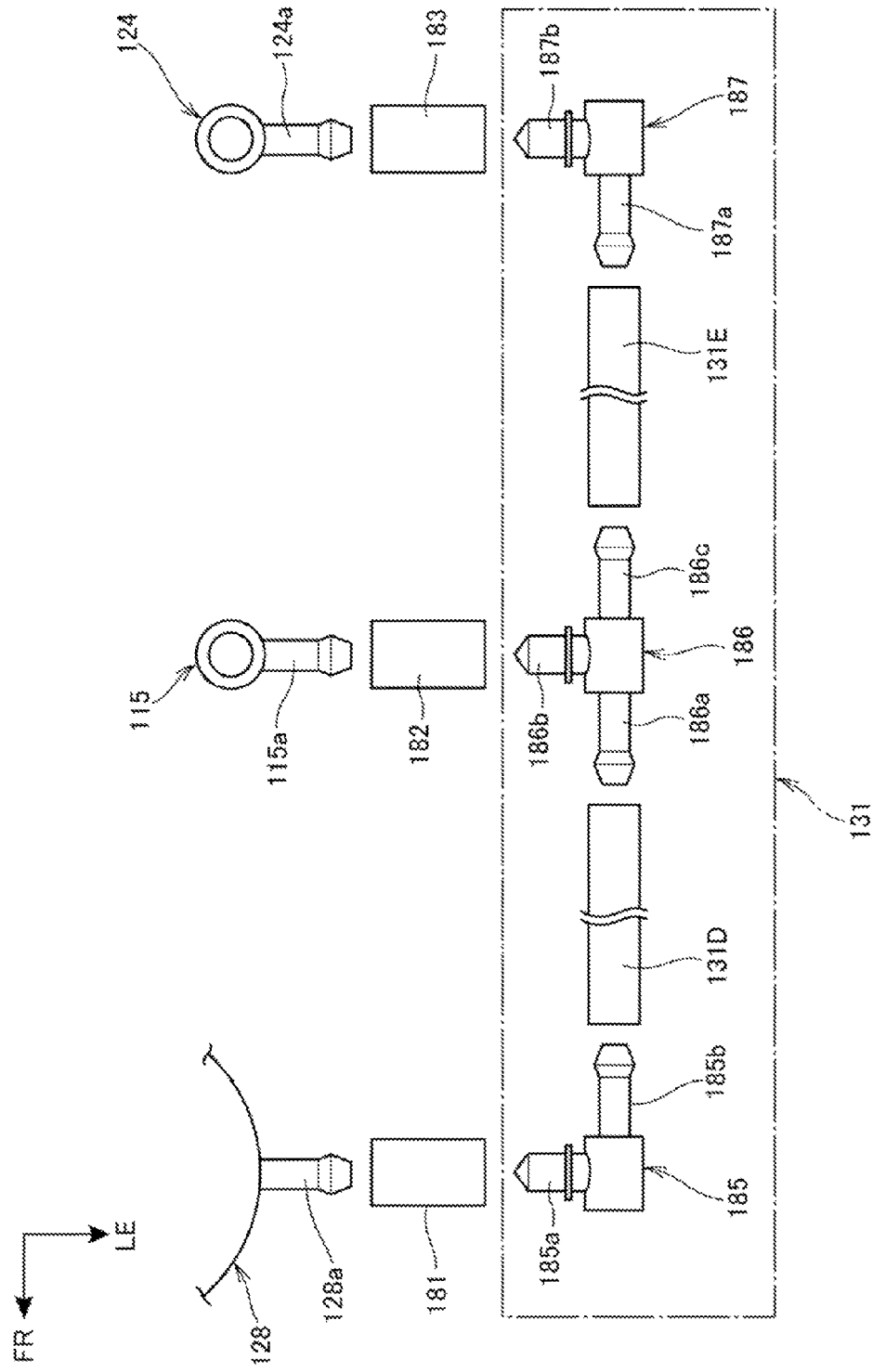
FIG. 8 is a diagram of assistance in explaining the fuel supply piping and vehicle body side assembly portions for the fuel supply piping.

FIG. 8 is a diagram of assistance in explaining the fuel supply piping 131 and vehicle body side assembly portions for the fuel supply piping 131.

The fuel pump 128 has a fuel discharge port 128a provided so as to project to the left in the vehicle width direction. The first fuel injection valve 115 and the second fuel injection valve 124 have the respective fuel suction ports 115a and 124a provided so as to project to the left in the vehicle width direction.

One end of a pump connecting hose 181 is connected to the fuel discharge port 128a. One end of a first injection valve connecting hose 182 is connected to the fuel suction port 115a. One end of a second injection valve connecting hose 183 is connected to the fuel suction port 124a. The pump connecting hose 181, the first injection valve connecting hose 182, and the second injection valve connecting hose 183 are made of rubber.

The fuel supply piping 131 includes the first L-shaped joint 185, the front side hose 131D, the T-shaped joint 186, the rear side hose 131E, the second L-shaped joint 187, and hose bands (not shown) that fasten connection portions of the respective parts.

The first L-shaped joint 185 includes a suction pipe portion 185a connected to the other end of the pump connecting hose 181 and a discharge pipe portion 185b connected to one end of the front side hose 131D. The suction pipe portion 185a and the discharge pipe portion 185b communicate with each other so as to form a fuel passage such that the suction pipe portion 185a and the discharge pipe portion 185b make an angle of 90° or an angle close to 90° with each other.

The T-shaped joint 186 includes a suction pipe portion 186a connected to the other end of the front side hose 131D, a first discharge pipe portion 186b connected to the other end of the first injection valve connecting hose 182, and a second discharge portion 186c connected to one end of the rear side hose 131E. The suction pipe portion 186a and the second discharge portion 186c are present on an identical straight line. The suction pipe portion 186a, the second discharge portion 186c, and the first discharge pipe portion 186b communicate with each other to form a fuel passage such that the suction pipe portion 186a and the second discharge portion 186c and the first discharge pipe portion 186b make an angle of 90° or an angle close to 90° with each other.

The second L-shaped joint 187 includes a suction pipe portion 187a connected to the other end of the rear side hose 131E and a discharge pipe portion 187b connected to the other end of the second injection valve connecting hose 183. The suction pipe portion 187a and the discharge pipe portion 187b communicate with each other to form a fuel passage such that the suction pipe portion 187a and the discharge pipe portion 187b make an angle of 90° or an angle close to 90° with each other.

The first L-shaped joint 185, the T-shaped joint 186, and the second L-shaped joint 187 are connected to the front side hose 131D and the rear side hose 131E such that the suction pipe portion 185a of the first L-shaped joint 185, the first discharge pipe portion 186b of the T-shaped joint 186, and the discharge pipe portion 187b of the second L-shaped joint 187 each project to the right in the vehicle width direction.

As described above, the use of the first L-shaped joint 185, the T-shaped joint 186, and the second L-shaped joint 187 as joints in an L-shape or a T-shape enables the respective connection portions of the first L-shaped joint 185, the T-shaped joint 186, and the second L-shaped joint 187 to be easily oriented toward the fuel pump 128, the first fuel injection valve 115, and the second fuel injection valve 124 on the vehicle body side while the longitudinal direction of the fuel supply piping 131 is oriented in the forward-rearward direction of the vehicle.

Figure 9:
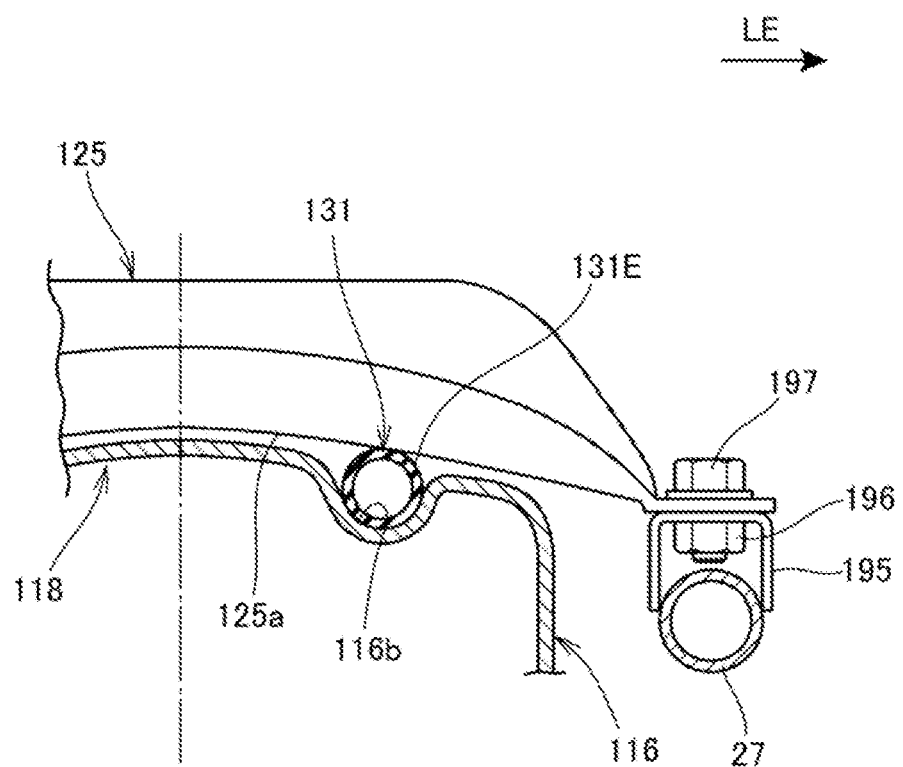
FIG. 9 is a sectional view of a positioning portion for the upstream side of the fuel supply piping.

FIG. 9 is a sectional view of a positioning portion for the upstream side of the fuel supply piping 131, and shows a state in which the upstream side of the fuel supply piping 131 and the periphery thereof are sectioned in the vehicle width direction and in a substantially vertical direction.

The fuel supply piping 131 is disposed in the recessed portion 116b provided in the front case 116 of the air cleaner case 118, and is held down from above by a front edge portion 125a of the intake side cover 125 attached to the left and right seat rails 27. That is, the fuel supply piping 131 is held and positioned between the front case 116 and the intake side cover 125. Therefore, the position of the fuel supply piping 131 is regulated in the upward-downward direction by the front case 116 and the intake side cover 125, and is further regulated in the vehicle width direction by the recessed portion 116b. Incidentally, a reference numeral 195 denotes a cover bracket attached to the seat rail 27. A reference numeral 196 denotes a nut attached to the cover bracket 195. A reference numeral 197 denotes a bolt for attaching the intake side cover 125 to the cover bracket 195, the bolt being screwed into the nut 196.

Figure 10:
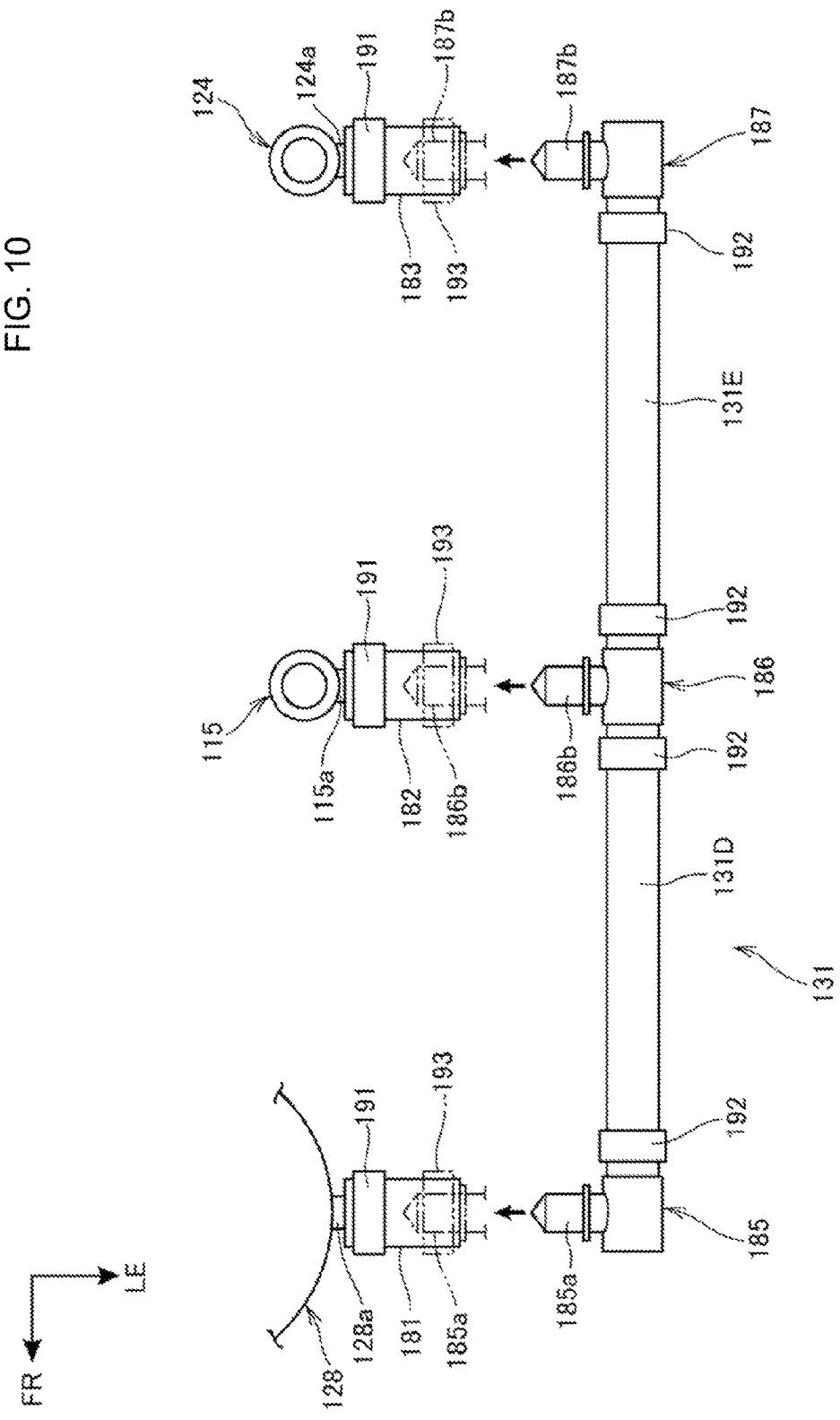
FIG. 10 is an action diagram showing a procedure for assembly of the fuel supply piping.

FIG. 10 is an action diagram showing a procedure for assembly of the fuel supply piping 131.

The pump connecting hose 181, the first injection valve connecting hose 182, and the second injection valve connecting hose 183 are respectively connected in advance to the fuel discharge port 128a of the fuel pump 128, the fuel suction port 115a of the first fuel injection valve 115, and the fuel suction port 124a of the second fuel injection valve 124. Incidentally, reference numerals 191 denote hose bands that fasten the pump connecting hose 181, the first injection valve connecting hose 182, and the second injection valve connecting hose 183 to prevent the pump connecting hose 181, the first injection valve connecting hose 182, and the second injection valve connecting hose 183 from falling off.

The suction pipe portion 185a, the first discharge pipe portion 186b, and the discharge pipe portion 187b in the first L-shaped joint 185, the T-shaped joint 186, and the second L-shaped joint 187 of the fuel supply piping 131 are oriented to the right in the vehicle width direction. Incidentally, reference numerals 192 denote hose bands that fasten the front side hose 131D and the rear side hose 131E to prevent the front side hose 131D and the rear side hose 131E from falling off of the first L-shaped joint 185, the T-shaped joint 186, and the second L-shaped joint 187.

Next, the suction pipe portion 185a is inserted into the pump connecting hose 181, the first discharge pipe portion 186b is inserted into the first injection valve connecting hose 182, and the discharge pipe portion 187b is inserted into the second injection valve connecting hose 183. Then, hose bands 193 that have been fitted on the pump connecting hose 181, the first injection valve connecting hose 182, and the second injection valve connecting hose 183 in advance are fastened. This completes the assembling of the fuel supply piping 131 to the side of the fuel pump 128, the side of the first fuel injection valve 115, and the side of the second fuel injection valve 124.

Thus, the fuel supply piping 131 including the suction pipe portion 185a, the first discharge pipe portion 186b, and the discharge pipe portion 187b oriented to the right in the vehicle width direction can be easily assembled to the pump connecting hose 181, the first injection valve connecting hose 182, and the second injection valve connecting hose 183 oriented to the left in the vehicle width direction from the fuel pump 128, the first fuel injection valve 115, and the second fuel injection valve 124. Therefore, assembly workability or maintainability at a time of maintenance involving detachment and attachment after the assembly can be improved even in a narrow space in the motorcycle.

As shown in FIG. 1, FIG. 3, and FIG. 6 described above, a fuel supply piping arrangement structure for a motorcycle 10 includes: an engine 14 as an internal combustion engine attached to main frames 22; an air cleaner 113 attached to seat rails 27; an intake air passage 166 connecting the engine 14 and the air cleaner 113 to each other; a pair of a first fuel injection valve 115 and a second fuel injection valve 124 attached, on a downstream side and an upstream side, respectively, to an intake device 47 as an intake system including the air cleaner 113 and the intake air passage 166; and fuel supply piping 131 having one end connected to a fuel tank 127 disposed on the main frames 22, and having another end side connected to each of the first fuel injection valve 115 and the second fuel injection valve 124, wherein fuel suction ports 115a and 124a as respective joint portions of the pair of the first fuel injection valve 115 and the second fuel injection valve 124, the joint portions being connected to the fuel supply piping 131, are oriented to one side in a vehicle width direction, a T-shaped joint 186 and a second L-shaped joint 187 as connector portions of the fuel supply piping 131, the connector portions being connected to the fuel suction ports 115a and 124a, are oriented to another side in the vehicle width direction toward the fuel suction ports 115a and 124a, and the fuel supply piping 131 is disposed along the intake device 47 and connected to the pair of the first fuel injection valve 115 and the second fuel injection valve 124 from the one side in the vehicle width direction.

According to this constitution, the fuel supply piping 131 can be disposed substantially linearly along the intake device 47, so that the fuel supply piping 131 can be shortened, and the fuel supply piping 131 connected to the two fuel injection valves, that is, the first fuel injection valve 115 and the second fuel injection valve 124 can be detached and attached from and to the one side of the vehicle body. Thus, assemblability and maintainability can be improved.

In addition, as shown in FIG. 8 and FIG. 10, the connector portions are formed by a T-shaped joint 186 connected to the first fuel injection valve 115 on the downstream side and a second L-shaped joint 187 connected to the second fuel injection valve 124 on the upstream side, and a first discharge pipe portion 186b and a discharge pipe portion 187b as respective connection portions from the T-shaped joint 186 and the second L-shaped joint 187 are oriented toward the fuel suction ports 115a and 124a. Thus, the connector portions of the fuel supply piping 131 can be oriented to the fuel suction ports 115a and 124a easily with a simple constitution.

In addition, as shown in FIG. 3, FIG. 5, and FIG. 7, the fuel supply piping 131 is disposed on the opposite side of the intake device 47 in the vehicle width direction from a throttle pulley 163 that opens and closes a throttle valve 176 provided in the intake air passage 166. Therefore, the fuel supply piping 131 can be detached and attached without interfering with the throttle pulley 163 and the throttle cables 161 and 162 connected to the throttle pulley 163. Thus, workability can be improved.

In addition, as shown in FIG. 3 and FIG. 4, the fuel supply piping arrangement structure further includes a cross member 92 that couples pivot plates 23 as a left frame and a right frame to each other and to which one end of a rear cushion unit 91 is attached, the intake device 47 is disposed so as to pass, in a forward-rearward direction, a central portion in the vehicle width direction above the cross member 92, the first fuel injection valve 115 and the second fuel injection valve 124 are attached on a center line of the intake device 47, the center line of the intake device 47 extending longitudinally, and the fuel supply piping 131 is attached so as to be offset to one side in the vehicle width direction with respect to the intake air passage 166, and is disposed between the left and right pivot plates 23. Therefore, while the fuel supply piping 131 is disposed on the central side of the vehicle body, the fuel supply piping 131 can be easily detached and attached from and to the first fuel injection valve 115 and the second fuel injection valve 124 without interfering with the intake device 47. Furthermore, the fuel supply piping 131 can be protected by the left and right pivot plates 23.

In addition, as shown in FIG. 5 and FIG. 6, the one end of the fuel supply piping 131 is connected to a fuel pump 128 attached to a lower portion within the fuel tank 127, and a position of the fuel supply piping 131 is regulated by a part of the fuel tank 127 via a rubber piece 167 as an elastic member. The rubber piece 167 can therefore suppress the vibration of the fuel supply piping 131.

In addition, as shown in FIG. 4 and FIG. 9, the second fuel injection valve 124 on the upstream side is attached to an air cleaner case 118 forming the air cleaner 113, and a recessed portion 116b as a positioning portion positioning the fuel supply piping 131 is formed in the air cleaner case 118. The recessed portion 116b can therefore further suppress the vibration of the fuel supply piping 131.

In addition, as shown in FIG. 2, FIG. 5, and FIG. 9, an intake side cover 125 as a protective cover covers the second fuel injection valve 124 on the upstream side from above, and the fuel supply piping 131 is held between the intake side cover 125 and the recessed portion 116b of the air cleaner case 118. The recessed portion 116b and the intake side cover 125 can therefore still further suppress the vibration of the fuel supply piping 131.

The foregoing embodiment merely represents one mode of the present invention, and modifications and applications can be made arbitrarily without departing from the spirit of the present invention.

In addition, the present invention is not limited to application to the motorcycle 10, but is applicable also to saddle riding type vehicles other than motorcycles. Incidentally, saddle riding type vehicles include vehicles in general that are ridden astride the vehicle bodies, and are vehicles including not only motorcycles (also including motor-assisted bicycles) but also three-wheeled vehicles and four-wheeled vehicles classified into ATV (all-terrain vehicles).

The invention claimed is:

1. A fuel supply piping arrangement structure for a motorcycle, said fuel supply piping arrangement structure comprising:
    an internal combustion engine attached to a main frame;
    an air cleaner attached to a seat rail;
    an intake air passage connecting the internal combustion engine to the air cleaner;
    an intake system comprising the air cleaner and the intake air passage;
    a first fuel injection valve attached on a downstream side of the intake system;
    a second fuel injection valve attached on an upstream side of the intake system; and
    fuel supply piping having one end connected to a fuel tank disposed on the main frame, and having another end side connected to each of the fuel injection valves,
    wherein respective joint portions of the first and second fuel injection valves are connected to the fuel supply piping and oriented to a first side of the fuel supply piping in a vehicle width direction,
    connector portions of the fuel supply piping are connected to the first and second joint portions and oriented to another side in the vehicle width direction toward the joint portions, and
    the fuel supply piping is disposed along the intake system and connected to the first and second fuel injection valves at the first side in the vehicle width direction.

2. The fuel supply piping arrangement structure for the motorcycle according to claim 1,
    wherein the connector portions are formed by a T-shaped joint connected to the first fuel injection valve and an L-shaped joint connected to the second fuel injection valve, and
    respective connection portions from the T-shaped joint and the L-shaped joint are oriented toward the joint portions.

3. The fuel supply piping arrangement structure for the motorcycle according to claim 1,
    wherein the fuel supply piping is disposed on an opposite side of the intake system in the vehicle width direction from a throttle pulley opening and closing a throttle valve provided in the intake air passage.

4. The fuel supply piping arrangement structure for the motorcycle according to claim 1, further comprising:
    a cross member that couples a left frame to a right frame; and
    a rear cushion unit having one end attached to the cross member,
    wherein the intake system is positioned so as to pass, in a forward-rearward direction, a central portion in the vehicle width direction above the cross member,
    the first and second fuel injection valves are attached on a center line of the intake system, the center line of the intake system extending longitudinally, and the fuel supply piping is attached so as to be offset to one side in the vehicle width direction with respect to the intake air passage, and is disposed between the left and right frames.

5. The fuel supply piping arrangement structure for the motorcycle according to claim 1,
wherein the one end of the fuel supply piping is connected to a fuel pump attached to a lower portion within the fuel tank, and a position of the fuel supply piping is regulated by a part of the fuel tank via an elastic member.

6. The fuel supply piping arrangement structure for the motorcycle according to claim 1,
wherein the second fuel injection valve is attached to an air cleaner case forming the air cleaner, and a positioning portion positioning the fuel supply piping is formed in the air cleaner case.

7. The fuel supply piping arrangement structure for the motorcycle according to claim 6,
wherein a protective cover covers the second fuel injection valve from above, and
the fuel supply piping is held between the protective cover and the positioning portion of the air cleaner case.

\* \* \* \* \*